(12) United States Patent
Franke et al.

(10) Patent No.: US 6,513,495 B1
(45) Date of Patent: Feb. 4, 2003

(54) DEVICE FOR SUPPRESSING ENGINE KNOCKING IN AN INTERNAL COMBUSTION ENGINE

(75) Inventors: Steffen Franke, Essex (GB); Oskar Torno, Schwieberdingen (DE); Axel Heinstein, Wimsheim (DE); Carsten Kluth, Stuttgart (DE); Werner Haeming, Neudenau (DE); Michael Baeuerle, Markgroeningen (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 09/889,839

(22) Filed: Oct. 30, 2001

(30) Foreign Application Priority Data

Jan. 21, 1999 (DE) .......................... 199 02 209

(51) Int. Cl.[7] .............................................. F02D 43/00
(52) U.S. Cl. .................................. 123/406.29; 123/436
(58) Field of Search ............................. 123/406.29, 436

(56) References Cited

U.S. PATENT DOCUMENTS

| 4,694,800 A | 9/1987 | Morita |
| 5,265,574 A | 11/1993 | Philipp et al. |
| 5,445,127 A | 8/1995 | Cullen et al. |
| 5,503,126 A | 4/1996 | Sakakibara et al. |
| 5,706,784 A | * 1/1998 | Steinbrenner et al. . 123/406.29 |

FOREIGN PATENT DOCUMENTS

| DE | 34 20 465 | 12/1984 |
| DE | 44 01 828 | 7/1995 |

* cited by examiner

*Primary Examiner*—Thomas N. Moulis
(74) *Attorney, Agent, or Firm*—Kenyon & Kenyon

(57) ABSTRACT

A device for suppressing engine knocks in an internal combustion engine, using a detection device for the detection of the respective operating parameters of the internal combustion engine; a control unit for determining manipulated variables for the injection and ignition on the basis of the acquired operating parameters; a dynamic phase detection device for acquiring a dynamic phase of the internal combustion engine; and a correction device for correcting the manipulated variables for the ignition, which is constructed so that for knock suppression, the ignition control quantity, given a dynamic phase acquired by the dynamic phase detection device, can be adjusted in the late direction by a dynamic lead that is dependent on a predicted load difference, and at the end of the dynamic phase can be brought step-by-step back to the manipulated variable determined by the control unit.

10 Claims, 4 Drawing Sheets

DEVICE FOR SUPPRESSING ENGINE KNOCKING IN AN INTERNAL COMBUSTION ENGINE

FIELD OF THE INVENTION

The present invention relates to a device for suppressing engine knocks in an internal combustion engine, including in a motor vehicle.

BACKGROUND INFORMATION

In German Patent No. 34 204 65 is discussed a device for suppressing engine knocks in an internal combustion engine. As characterized, operating parameters of the internal combustion engine are acquired, and on the basis of these acquired operating parameters, in a control unit the respective manipulated variables for the processes to be controlled, such as, for example, ignition and injection, are determined. Thus, for example, on the basis of rpm and current load, the optimal ignition point is calculated.

As further characterized, moreover, a knock detector acquires the combustion noises of the individual cylinders. The signals of the knock detector are forwarded to a knock signal evaluation circuit, and there, after filtering out the background noise, they are compared with a reference level. If a knocking combustion is recognized, then for a knock suppression the ignition point, determined on the basis of rpm and load, in this cylinder is retarded, and thus away from the knock limit. After a predeterminable number of knock-free combustions, this modified ignition point is again led back step-by-step to the manipulated variable determined by the control apparatus. Since, given a cold engine, there may be no danger of knocking combustions, the knock control may be switched to active only after a predeterminable engine temperature has been reached, i.e., after warming up the internal combustion engine. Below this enable temperature, it is believed to be at least reasonably certain that no knocks can occur, because the thermal conditions in the combustion chamber do not allow this.

In certain systems, for the determination of the engine temperature, the cold water temperature or the gas entry temperature into the combustion chamber may be determined.

In German Published Patent Application No. 44 01 828 is discussed a method that enables a prediction that is as precise as possible, at the time of the calculation of the quantity of fuel to be metered, of the air charge of the cylinder into which the quantity of fuel is injected.

As characterized in German Published Patent Application No. 44 01 828, a future load signal is determined that represents the relative air charge to be expected. The future load signal is determined from a current main load signal, a current auxiliary load signal that runs in front of the current main load signal, and a crank angle interval. The crank angle interval can be predetermined dependent on the fuel preconditioning, expressed in time units or crank angle units, the duration of the fuel injection, and the calculation time. The inclusion of the crank angle interval has the advantage that the determination of the future load signal can be carried out or performed at the latest possible time, thereby achieving a high degree of precision.

It may be useful that the future load signal is determined using a lowpass filter whose filter constant can be predetermined dependent on load. The filter constant is read out from a first characteristic given an increasing load, and is read out from a second characteristic given a decreasing load. In this way, a predetermination of the air charge is possible that may be particularly economical in terms of computing time.

The auxiliary load signal is determined from the opening angle of the throttle valve, the rpm of the internal combustion engine, and an air quantity that flows to the throttle valve, through a bypass duct if necessary, and is corrected dependent on the temperature of the intake air and the barometric altitude.

Given small opening angles of the throttle valve, the auxiliary load signal can also be determined from the air mass, acquired using an air mass meter, which may result in a higher degree of precision in this operating range.

The main load signal can for example be determined from the measured intake pipe pressure and the rpm, from the air mass acquired using an air mass meter, or through filtering of the auxiliary load signal.

The method can be used both in non-stationary operation and also in stationary operation, since in the determination of the future load signal an auxiliary load signal matched to the main load signal can be used. The compensation value required for the compensation of the auxiliary load signal is determined through integration of the deviation between the main load signal and the filtered auxiliary load signal provided with the compensation value. The filtered auxiliary load signal is thereby produced by filtering the corrected auxiliary load signal.

In this method, the future load signal is used only for the determination of the quantity of fuel to be injected.

The problem is believed to be that given dynamic changes in load, spark ignition engines may exhibit an increased tendency to knock in comparison with stationary operation. An attempt may be made to counter this by issuing what may be referred to as an adaptive dynamic lead, i.e., an additional late adjustment of the ignition angle during the dynamic phase.

This additional dynamic lead is issued when the load gradient (i.e., the instantaneous velocity or instantaneous slope of the change of load), exceeds an applicable threshold value. The dynamic lead is then maintained over an applicable time, and is subsequently controlled to zero.

In the above approach, it is believed to be disadvantageous that the load gradient, as a differential, and therefore instantaneous, quantity, does not contain any information concerning the change of load that actually occurs during the overall, following, dynamic phase. This change of load results afterwards from the integration of the load gradient over time, which, however, may be too late for the determination of the dynamic lead.

That is, the issuing of the dynamic lead may depend only on how rapidly the load is changing at a point in time during the dynamic phase. Consequently, given a small, rapid change of load, the same dynamic lead may be issued as in the case of a large and likewise rapid change of load.

This is illustrated in FIG. 5. There, t designates time, tdyst designates the starting time of the dynamic phase, tdyena designates the end time of the dynamic phase for the case a, tdyenb designates the end time of the dynamic phase for the case b, rl designates the air charge, and drl designates the air charge gradient. In case a, a large, rapid change of air charge Δrla is present, and in case b a small, likewise rapid change of air charge Δrlb is present.

The thermal changes inside the engine, which influence the tendency to knock, may be much stronger in case a, and a greater dynamic lead should correspondingly take place.

However, this may require that the integrated change of load that is to be expected be known already at the time of the triggering of the dynamic. Such information may not be available in the existing devices for suppressing engine knocks in an internal combustion engine.

SUMMARY OF THE INVENTION

The exemplary device according to the present invention is believed to have the advantage that it may enable a physically based, dynamically more precise determination of the dynamic lead, and thus a better suppression of knocking in the dynamic phase.

It is also believed that the adaptation algorithm may result in more precise adaptation values, and thus an improved dynamic behavior. The plausibility of the adaptation values can be better judged, thus simplifying the application method.

The exemplary embodiment involves determining the dynamic lead on the level of a predicted change of load signal or change of charge signal. It is noted that 'load signal' and '(air) charge signal' are here used synonymously, since they are linked with one another via a "simple" proportionality factor.

For example, from the torque requirement, determined according to the accelerator pedal position and additional input quantities, a setpoint load or setpoint charge can be calculated. In this context, the actual load is adjusted to the setpoint load with a delay through corresponding positioning of the throttle valve and, if necessary, driving of the turbocharger. That is, at the instant of a large change in load required by the torque coordination, there is an immediate change to the actually existing charging in response thereto. However, with the predicted load difference, a measure for the change in load that is actually to be expected in the dynamic phase is already present at this point in time.

This means that in the dynamic case, instead of a signal indicating the instantaneous load gradient, the difference of a predicted load signal and an instantaneous load signal is used for the determination of the dynamic lead.

The magnitude of the dynamic lead is believed to be better adapted to the actual physical requirements, i.e., magnitude and velocity of the change of load. The issuing of unjustifiedly large dynamic leads, and, concomitant therewith, the worsening of the degree of efficiency and of the response characteristic of the engine, may be avoided in this way. Here, already-existing quantities of the motor controlling can be used.

In this way, what may be an essential cause of dynamic knocking, which may not optimally be taken into account by other ways of providing dynamic adaptation of the knock control, can be removed.

According to one exemplary embodiment, the correction device is constructed so that the dynamic lead is dependent on at least one acquired operating parameter, which may be the rpm.

According to another exemplary embodiment, the correction device is constructed so that it determines the predicted load difference by: detection of the load signal at a time located before the ignition point to be determined; prediction of a future load signal at a later time located before the ignition point to be determined; and formation of the difference of the future load signal and the load signal.

According to another exemplary embodiment, the correction device is constructed so that it predicts the future load signal from a current main load signal, a current auxiliary load signal that runs in front of the current main load signal, and a crank angle interval that can be predetermined dependent on the calculation time, expressed in time units or crank angle units.

According to another exemplary embodiment, the current auxiliary load signal can be determined from the opening angle of the throttle valve, the rpm of the internal combustion engine, and a quantity of air flowing, if necessary, through a bypass duct to the throttle valve and/or through additional bypass valves.

According to another exemplary embodiment, the current main load signal can be determined from the measured intake pipe pressure and the rpm, from the air mass acquired using an air mass meter, or through filtering of the current auxiliary load signal.

According to another exemplary embodiment, the correction device is constructed so that the prediction of the future load signal takes place with a taking into account of the camshaft control and/or the exhaust gas recirculation.

According to another exemplary embodiment, the dynamic phase detection device is constructed so that it acquires a dynamic phase of the internal combustion engine from the fact that the load gradient exceeds a predetermined threshold value.

According to another exemplary embodiment, the correction device is constructed so that it predicts the load difference at the time of the detection of a dynamic phase.

According to another exemplary embodiment, a knock detection device is provided that is constructed so that a knock monitoring can be carried out during the dynamic phase, and, dependent on the result of the knock monitoring, an adaptation of the dynamic lead can be carried out.

According to another exemplary embodiment, the correction device is constructed so that it compares the load difference predicted at the beginning of the dynamic phase with a load difference acquired at the end of the dynamic phase, and enables the adaptation only if the difference is smaller than a predetermined value.

DETAILED DESCRIPTION

Figure 1:
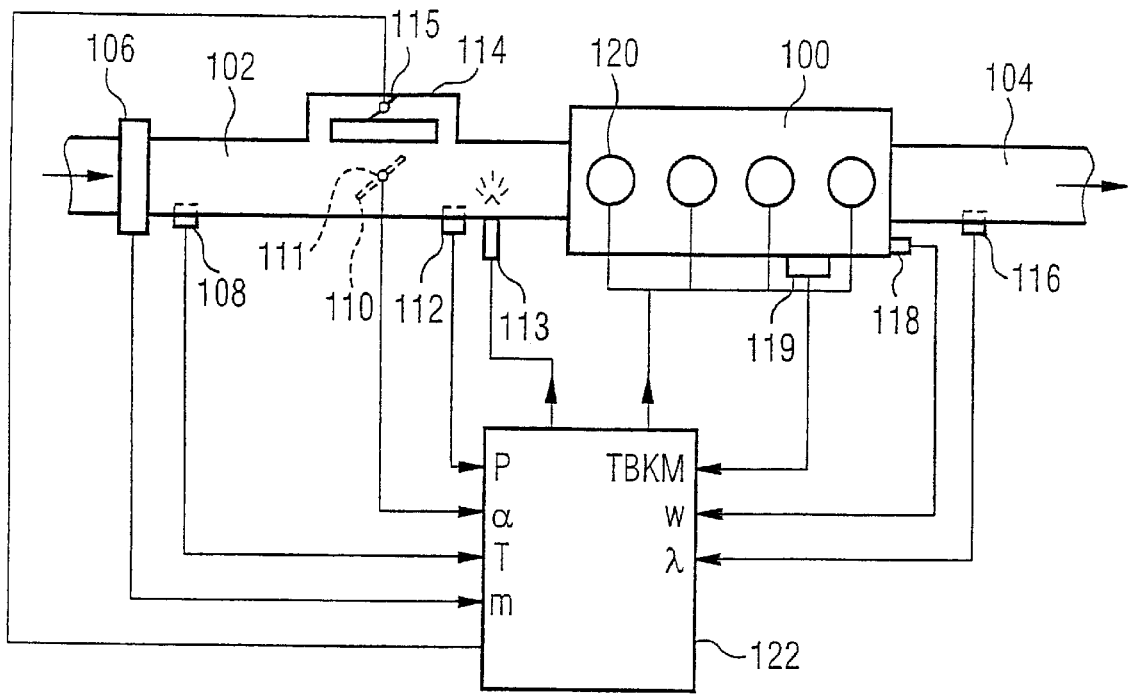
FIG. 1 shows the technical environment of an internal combustion engine 100 in which the exemplary embodiments of the present invention can be used.

In the figures, identical reference characters designate identical, functionally identical or corresponding components.

FIG. 1 shows the technical environment of an internal combustion engine 100 in which the exemplary embodiments of the present invention can be used.

First, the illustrated components for controlling internal combustion engine 100 are explained in more detail. Via an intake section 102, an air/fuel mixture is supplied to internal combustion engine 100, and the exhaust gases are emitted into an exhaust duct 104. In intake section 102, seen in the direction of flow of the intake air, there are attached an air flow meter or air mass meter 106, for example a hot wire air mass meter, a temperature sensor 108 for acquiring the temperature of the intake air, a throttle valve 110 having a sensor 111 for acquiring the angle of opening of throttle valve 110, a pressure sensor 112, and one or more injection nozzles 113. As a rule, air flow meter or air mass meter 106 and pressure sensor 112 are alternatively present.

A bypass duct 114, in which an idle actuator 115 is situated, leads around throttle valve 110. Bypass duct 114 and idle actuator 115 can be omitted if the controlling of the idle rpm takes place with the aid of throttle valve 110. If necessary, bypass valves can additionally be present, which for example ensure a sufficient idle rpm when a climate control system is switched on. In exhaust duct 104, there is attached an oxygen sensor 116. A crank angle sensor 118 and a sensor 119 for acquiring the temperature of internal combustion engine 100 are attached to internal combustion engine 100. In addition, internal combustion engine 100 has, for example, four spark plugs 120 for the ignition of the air/fuel mixture in the cylinders.

The output signals of the described sensors are communicated to a central control apparatus 122. Specifically, the following signals are concerned: a signal m of air flow meter or air mass meter 106, a signal T of temperature sensor 108 for acquiring the temperature of the intake air, a signal α of sensor 111 for acquiring the opening angle of throttle valve 110, a signal p of pressure sensor 112, a signal λ of oxygen sensor 116, a signal w of crank angle sensor 118, and a signal TBKM of sensor 119 for acquiring the temperature of internal combustion engine 100. Control apparatus 122 evaluates the sensor signals and controls injection nozzle or nozzles 113, idle actuator 115, and the ignition point for spark plugs 120. The calculation of the dynamic lead must be terminated at the closing time $t_s$ of the ignition coil, i.e., must be carried out or performed long before the charge angle.

For the calculation of the dynamic lead, however, the change in air charge is used, which is represented by the difference of main load signal tL present at the charge angle and the main load signal present at the beginning of the dynamic phase. That is, it is necessary to be able to predict the charge difference or load difference.

The method discussed in German Published Patent Application No. 44 01 828 may provide an approximate prediction of load signal tL present at the filling angle. The signal being designated in the following as future load signal tLPr. Here, it is in particular exploited that the main influencing factor on the curve of future load signal tLPr—opening angle α of throttle valve 111—is known, and that signal α runs somewhat ahead of signal tL. More information concerning this is shown in FIG. 2.

Figure 2:
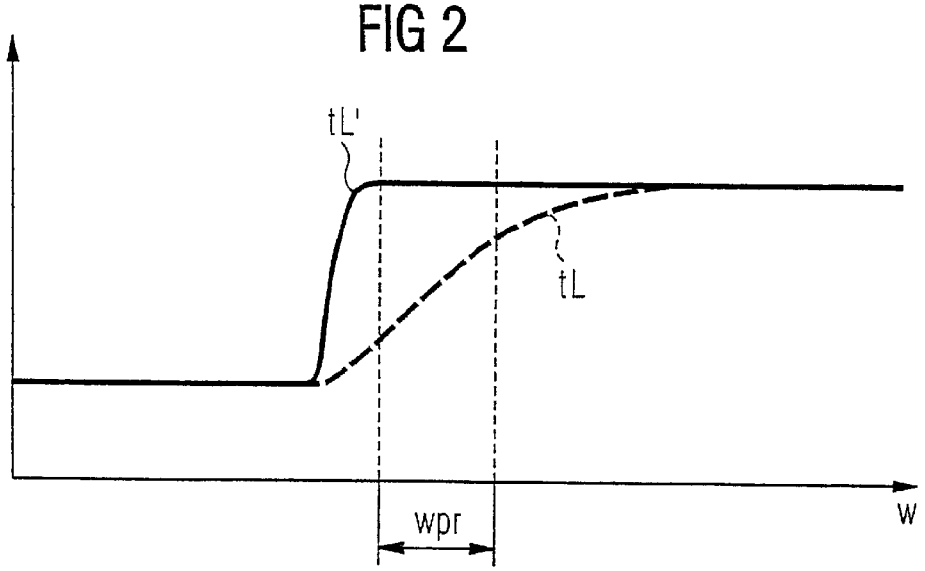
FIG. 2 shows a diagram in which the main load signal tL (broken line) and the auxiliary load signal tL' (solid line) are plotted over the crank angle w.

FIG. 2 shows a diagram in which main load signal tL (broken line) and auxiliary load signal tL' (solid line) are plotted over crank angle w. In stationary operation, the curves for tL and tL' coincide (left or far right). At the transition from low to high load, the curve for tL' climbs considerably more rapidly than does the curve for tL, so that future values for tL can be predicted from current values for tL' and tL. That is, from current auxiliary load signal tL' and current main load signal tL, future load signal tLPr can be determined.

For the determination of future load signal tLPr, a "simple" intake pipe model can be used as a basis, which may be described by a first-order lowpass having a load-dependent filter constant. At current crank angle w, future load signal tLPr, present at future crank angle w+wPr, is predicted according to the following equation:

$$tLPr=tL(w+wPr)=tL(w)+(tL'(w)-tL(w))\,(1-\exp(-wPr/wF))$$

Here, wPr is the prediction angle, which is, the difference of the future crank angle for which future load signal tLPr is predicted (as a "rule", this may be the charge angle) and momentary crank angle w.

It is believed that a conversion between load signal tL and charge signal rl is straightforward.

In the currently standardly used adaptation and issuing of a dynamic lead wkrdya, on which the exemplary embodiments of the present invention is based, with the beginning of the dynamic at time tdyst, e.g. at drl>threshold value, the rpm range stkrnx in which the internal combustion engine is currently located is determined, and is stored in a register in the form of a RAM memory. Dynamic lead wkrdya, adapted to this rpm range stkrnx in previous dynamic phases, is read out from the RAM memory and is outputted. During the dynamic phase, occurring knock events are classified, if necessary, according to their strengths, into normal and strong events. From this classification, at the end of the dynamic phase, at time tdyen, e.g., at drl<threshold value, the value is determined by which the outputted dynamic lead must, if necessary, be corrected. That is, under certain conditions a new dynamic lead is adapted for this rpm range wkrdya'. Here, limits are predetermined for the range within which adaptation may take place.

Figure 3:
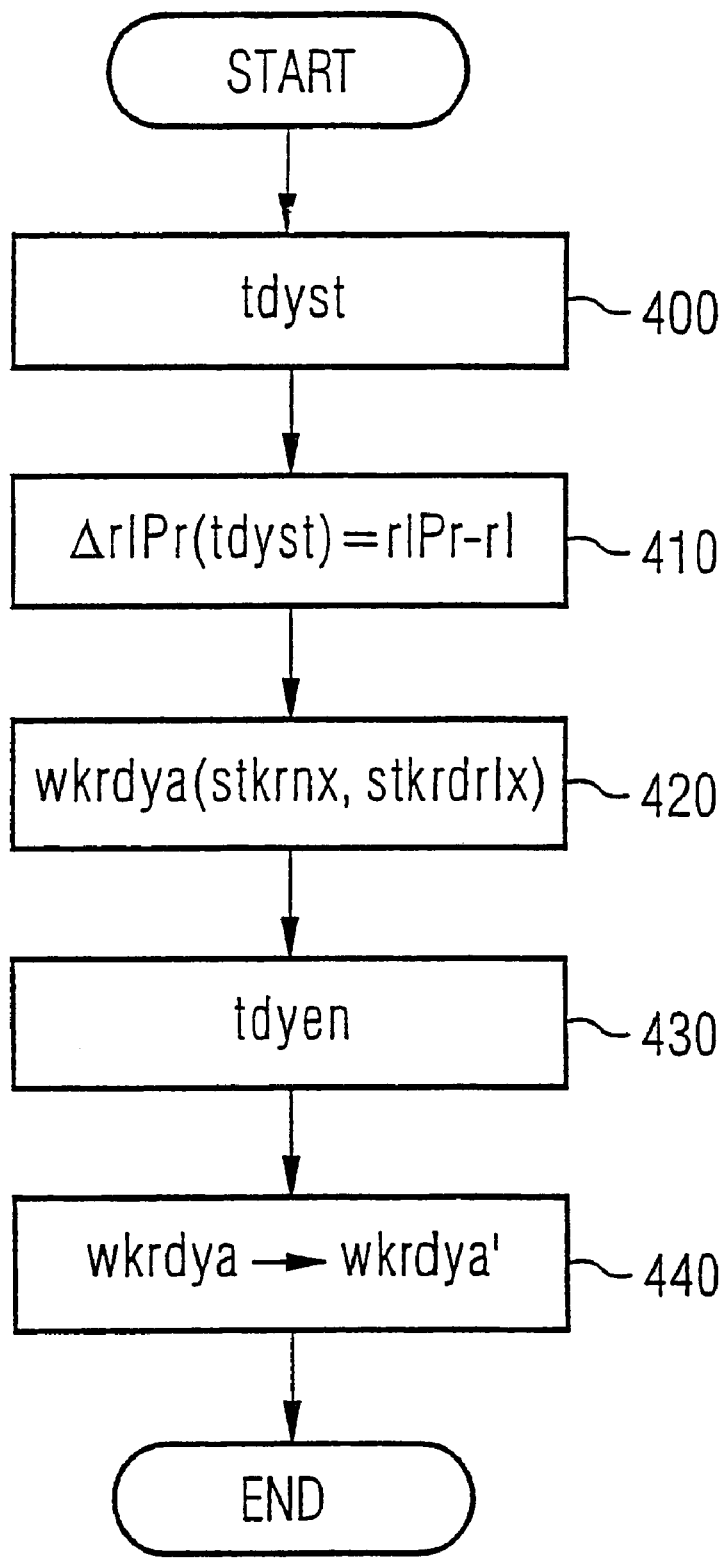
FIG. 3 shows a flow diagram for the flow in principle of a first exemplary embodiment of the present invention.

FIG. 3 shows a flow diagram for the flow in principle of a first exemplary embodiment of the invention.

In an exemplary embodiment of the present invention, the adaptation range, in addition to the rpm in the form of the rpm range stkrnx, is also fixed via the predicted load difference ΔrlPr=rlPr−rl to be effected at instant tdyst, in an analogous manner, in the form of a load difference range stkrdrlx.

For this purpose, with the detection of the beginning of the dynamic at tdyst (step 400), rpm range stkrnx is determined, as previously, from the current rpm n, and is stored. In addition, expected load difference ΔrlPr, rlPr−rl, is formed and is stored (step 410).

From ΔrlPr, via a corresponding characteristic the corresponding load difference range stkrdrlx is determined and stored. The variables or quantities stkrnx and stkrdrlx now address the adaptation range from which the lead wkrdya is read out for the subsequent dynamic phase (step 420).

This value can optionally also be weighted with a temperature-dependent factor, and subsequently outputted for further processing.

During the dynamic phase, a classification of occurring knock events is carried out, from which, at the acquired end of the dynamic phase at time tdyen (step 430) the value is determined by which the issued dynamic lead must, if necessary, be corrected to reach a corrected dynamic lead wkrdya' for the next cycle (step 440). This terminates the execution of the flow diagram.

Figure 4:
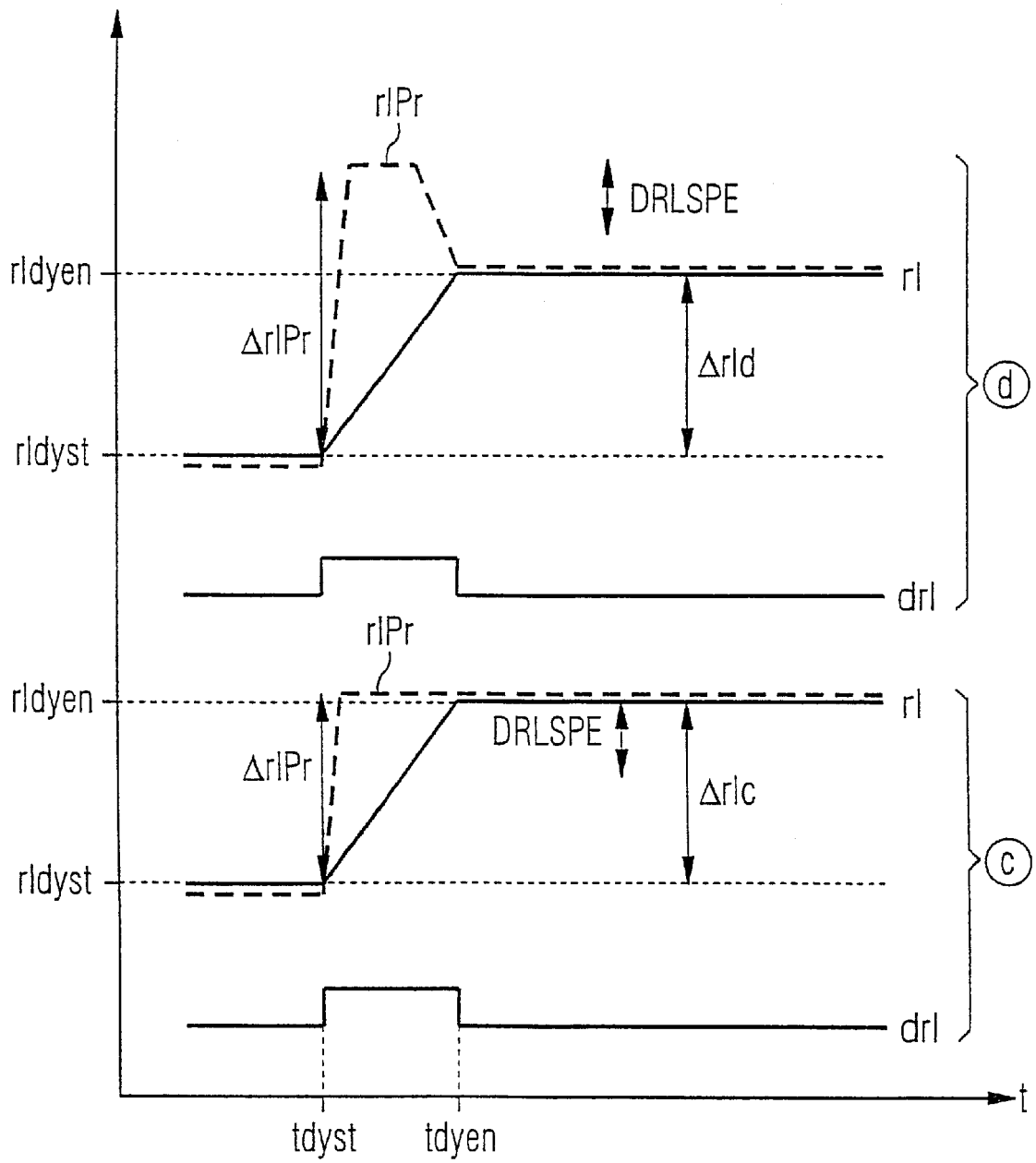
FIG. 4 shows a schematic representation of the chronological curve of the air charging and of the air charge gradient, for the explanation of a second exemplary embodiment of the present invention, in case c given the occurrence of the change in load predicted at tdyst, and in case d given the non-occurrence of the change in load predicted at tdyst.
Figure 5:
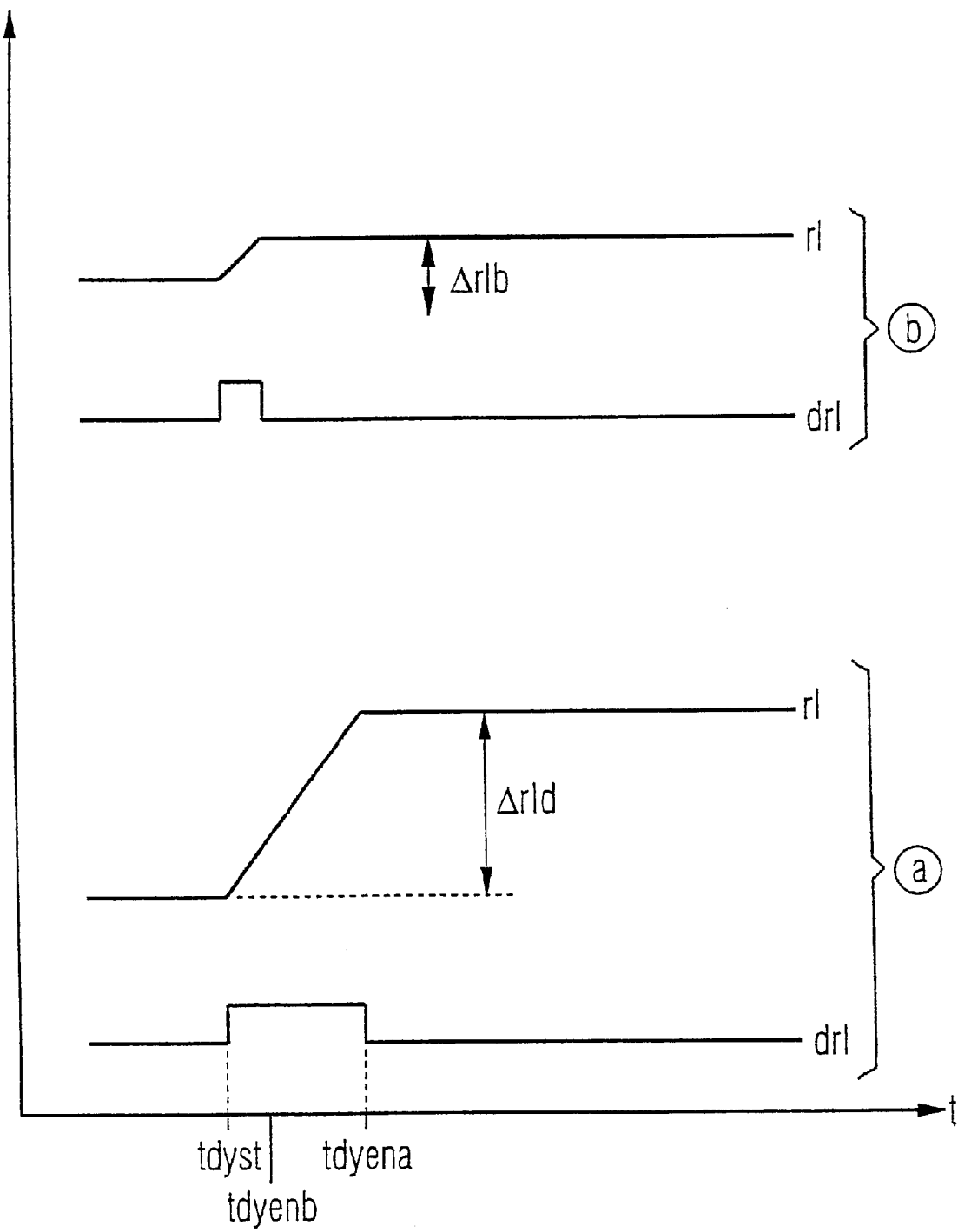
FIG. 5 shows a schematic representation of the chronological curve of the air charging and of the air charge gradient, in case a given a large, rapid change of load, and in case b given a small, likewise rapid change of load.

FIG. 4 shows a schematic representation of the chronological curve of the air charging and of the air charge gradient, for the describing of the exemplary embodiment of the present invention, in case c given occurrence of the change of load predicted at tdyst, and in case d given the non-occurrence of the change of load predicted at tdyst.

In addition to the previous exemplary embodiment, in the other exemplary embodiment there occurs a 'plausibilization' of the correction value, in the sense that the change of air charge Δrl that actually occurs during the dynamic agrees with the previously calculated change of air charge ΔrlPr within plausible (applicable) limits.

For this purpose, simultaneously or essentially simultaneously with the beginning of the dynamic, the air charging rl is stored in the RAM memory as rldyst. Likewise, at the end of the dynamic the air charge rl is in turn stored in the RAM memory as rldyen. If the change of air charge Δrl=rldyen−ridyst deviates downwards from the previously calculated change of air charge ΔrlPr by a maximum of DRLSPE, the adaptation is allowed. That is, the accumulator for the new calculation of an adaptation value is activated only if $$DRLSPE + rldyen - rldyst \geq \Delta rlPr$$

or $$rldyen - rldyst \geq \Delta rlPr - DRLSPE$$

Otherwise, an adaptation may not make sense, because the dynamic lead issued on the basis of ΔrlPr may not fit the actually occurrent change of air charge rldyen−ridyst.

In FIG. 4, in case c Δrlc≧ΔrlPr−DRLSPE, i.e., an adaptation makes sense, while in case d Δrld<ΔrlPr−DRLSPE, and an adaptation may make no sense.

The speed of regulation of the dynamic lead after termination of the dynamic is usefully likewise made dependent on the comparison DRLSPE+rldyen−rldyst>ΔrlPr. If the actual change of load is smaller than predicted by at least DRLSPE, the speed of regulation is increased, for example doubled. Otherwise, regulation takes place with the "normal" predetermined speed.

In another exemplary embodiment of the present invention, the adaptation range is fixed only via the air charge difference ΔrlPr that is to be expected, in the form of a load difference range stkrdrlx (that is, not via the rpm range). For the knock tendency in the dynamic, precisely this quantity is decisive. It implicitly contains an rpm dependency, in the sense that the maximum possible change of load is rpm-dependent. A further rpm dependency occurs with respect to the temperature influence. The above-stated temperature-dependent weighting factor is therefore usefully additionally applied via rpm n, in the form of a characteristic map (n, evtmod), instead of being applied only via the modelled temperature evtmod at the inlet valve. In this way, the actual rpm dependencies should be acquired at the physically correct points. The further procedure corresponds to that of the first or second exemplary embodiments.

The present invention is not limited to the above exemplary embodiments, methods and/or prediction procedures. For example, the updating errors of the calculation of the ignition angle can be compensated through the use of a predicted signal, and additionally may take into account camshaft displacement and exhaust gas recirculation.

LIST OF REFERENCE CHARACTERS wPr prediction angle
tL main load signal
tL' auxiliary load signal
w crank angle
t time
wF filter constant
tLPr predicted future load signal
n rpm
100 internal combustion engine
102 intake section
104 exhaust duct
106 air mass meter
108 temperature sensor
110 throttle valve
111 sensor for acquiring the opening angle of throttle valve 110
112 pressure sensor
113 injection nozzles
114 bypass duct
115 idle actuator
116 oxygen sensor
118 crank angle sensor
119 temperature sensor
120 spark plugs
tdyst ubeginning of dynamic phase
tdyen end of dynamic phase
ΔrlPr predicted air charge difference
rlPr predicted air charge
rl air charge
stkrnx rpm range
stkrdrlx load difference range
wkrdya a dynamic lead
wkrdya' adapted dynamic lead
rldyst air charge at tdyst
rldyen air charge at tdyen ΔΔrl−a, b, c, d actual load difference
drl load gradient
DRLSPE adaptation threshold

What is claimed is:

1. A method for suppressing engine knocking in an internal combustion engine in at least one dynamic operating state, the method comprising:

detecting at least one operating parameter of the internal combustion engine with a detecting device;

calculating an ignition angle dependent on the at least one operating parameter with a control unit:

considering a dynamic lead in the at least one dynamic operating state;

detecting a strength of a knocking event with a knock monitoring unit; and recognizing the at least one dynamic operating state of the internal combustion engine with a dynamic-phase recognition device;

calculating from the at least one operating parameter an instantaneous load signal, a future load signal, and an instantaneous load difference of the instantaneous load signal and the future load signal with the control unit;

determining the dynamic lead based on the load difference by reading a respective dynamic lead value from a characteristic map stored in the control unit, a plurality of dynamic lead values in the characteristic map being allocated to load difference ranges, the respective dynamic lead value being from a characteristic map region whose load difference range corresponds to the instantaneous load difference; and adapting the respective dynamic lead value in the characteristic map at an end of the at least one dynamic operating state corresponding to the strength of the knocking event.

2. The method of claim 1, wherein the at least one operating parameter includes at least one of an instantaneous rpm, an intake air temperature, an opening angle of a throttle valve, an intake pipe pressure, a quantity of intake air, a mass of intake air, a crank angle, and a temperature of the internal combustion engine.

3. The method of claim 2, wherein the plurality of dynamic lead values in the characteristic map are also allocated to rpm ranges, the respective dynamic lead being read from a characteristic map region having an rpm range corresponding to the instantaneous rpm.

4. The method of claim 2, wherein the dynamic-phase recognition device recognizes the at least one dynamic operating state of the internal combustion engine when a load gradient exceeds a predetermined threshold value.

5. The method of claim 2, wherein the future load signal is calculated from an instantaneous main load signal, an instantaneous auxiliary load signal that runs ahead of the instantaneous main load signal, and a crank angle interval that is predetermined based on a calculation time, expressed in at least one of time units and crank angle units.

6. The method of claim 5, wherein the instantaneous auxiliary load signal is determined from an opening angle of a throttle valve, an instantaneous rpm of the internal combustion engine, and a quantity of air that may flow through at least one of a bypass duct to a throttle valve and at least one additional bypass valve.

7. The method of claim 5, wherein the instantaneous main load signal is determined from at least one of: a measured intake pipe pressure and an instantaneous rpm; an air mass detected using an air mass meter; and a filtering of the instantaneous auxiliary load signal.

8. The method of claim 2, wherein the future load signal is determined by considering at least one of a camshaft control and an exhaust gas recirculation.

9. The method of claim 2, wherein the load difference is determined at an instant when the at least one dynamic operating state is detected.

10. The method of claim 2, further comprising:

comparing a first load difference detected at a beginning of the at least one dynamic operating state with a second load difference detected at an end of the at least one dynamic operating state by using the control unit; and adapting the respective dynamic lead value stored in a respective characteristic map region at the end of the at least one dynamic operating state only if a difference of the first load difference and the second load difference is smaller than a predetermined value.

* * * * *